United States Patent [19]

Riederer et al.

[11] Patent Number: 4,569,648

[45] Date of Patent: Feb. 11, 1986

[54] SELF-CLEANING ROTATING DRUM

[75] Inventors: Emil Riederer; Karl-Ludwig Zahn; Rudolf Bencker, all of Trostberg, Fed. Rep. of Germany

[73] Assignee: SKW Trostberg Aktiengesellschaft, Trostberg, Fed. Rep. of Germany

[21] Appl. No.: 692,364

[22] Filed: Jan. 16, 1985

[30] Foreign Application Priority Data

Jan. 21, 1984 [DE] Fed. Rep. of Germany ....... 3402059

[51] Int. Cl.$^4$ .............................................. B29C 67/00
[52] U.S. Cl. .................... 425/222; 51/164.1; 159/11.2; 241/182; 366/54
[58] Field of Search ............ 425/217, 222, 440; 241/182, 183; 51/164.1; 159/11.2; 366/44, 54

[56] References Cited

U.S. PATENT DOCUMENTS

| | | | |
|---|---|---|---|
| 2,603,832 | 7/1952 | Clark et al. | 425/222 |
| 2,711,557 | 6/1955 | Russell | 425/217 |
| 2,812,541 | 11/1957 | Webster et al. | 425/222 |
| 3,467,319 | 9/1969 | Rampe | 241/182 |
| 3,934,828 | 1/1976 | Persson | 241/182 |
| 4,349,327 | 9/1982 | Balz | 425/440 |

FOREIGN PATENT DOCUMENTS

| | | | |
|---|---|---|---|
| 76031 | 9/1891 | Fed. Rep. of Germany | 241/182 |
| 1131489 | 6/1962 | Fed. Rep. of Germany | 241/183 |
| 2053235 | 3/1975 | Fed. Rep. of Germany | . |
| 31484 | 7/1952 | Luxembourg | . |
| 0946660 | 7/1982 | U.S.S.R. | 241/182 |
| 1044329 | 9/1983 | U.S.S.R. | 241/183 |

Primary Examiner—Willard E. Hoag
Attorney, Agent, or Firm—Toren, McGeady, Stanger, Goldberg & Kiel

[57] ABSTRACT

The invention relates to a rotating drum having a lining which avoids caking-on, the rotating drum being lined with movable elastic material basic webs fitted at a distance from the inner side of the drum and the securing positions of the basic webs being covered over by preferably thinner elastic overlapping webs with bevelled edges.

11 Claims, 1 Drawing Figure

U.S. Patent    Feb. 11, 1986    4,569,648
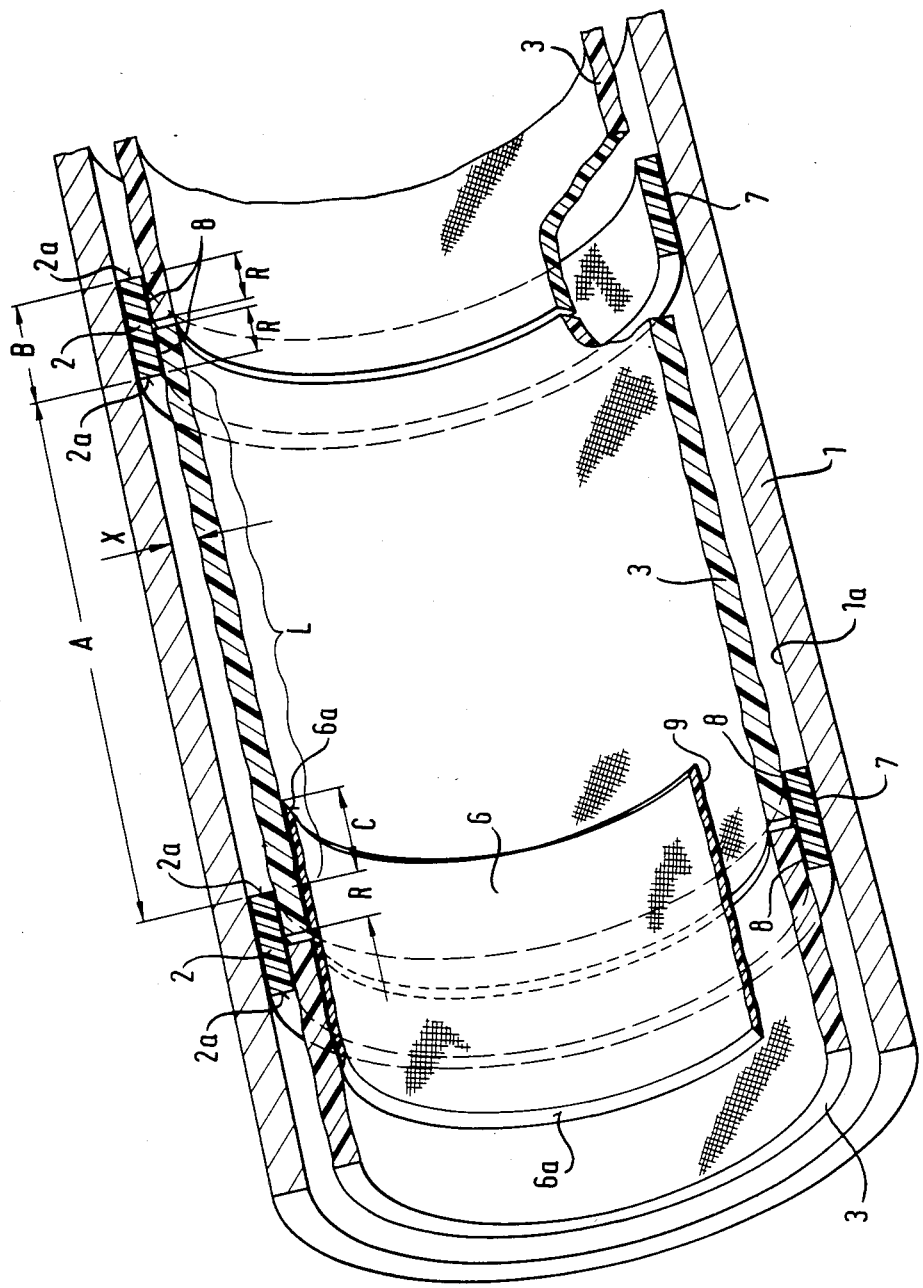

SELF-CLEANING ROTATING DRUM

BACKGROUND OF THE INVENTION

The invention relates to a self-cleaning rotating drum the axis of rotation of which is horizontal or slightly inclined in relation to the horizontal, with at least two basic webs of elastic material avoiding the caking-on of material, which are arranged side by side in the axial direction of the rotating drum, on the inner side of the rotating drum, as lining and are connected with the rotating drum in their marginal regions axially facing one another.

STATEMENT OF PRIOR ART

Many kinds of endeavours have already been undertaken to avoid caking or encrustations in rotating drums. More especially linings have been proposed, the range of which extended from high-gloss-polished steel by way of special types of ceramic materials to different synthetic plastics material coatings. Furthermore fittings were suggested, such as scrapers, chains or hammers, which were intended to keep the interior of the draum clear from caking.

In Fed. German Publ. Spec. No. 2,053,235 a rotating drum was described wherein the inner surface is covered with longitudinal strips of rubber which sag in the upper position in the movement of the drum, so that the crusts occurring on them are detached.

Such longitudinal strips are usable in only relatively small rotating drums, since as a result of the inherent weight of the material these are subject to heavy wear.

OBJECT OF THE INVENTION

An object of the invention is to produce a rotating drum usable on a large industrial scale in which caking-on of the moved material is not possible or is largely avoided.

SUMMARY OF THE INVENTION

According to the invention this object is achieved in that the basic webs are arranged, at their marginal regions axially facing one another, at a radial distance from the inner side of the rotating drum and in each case an overlapping web covers over the marginal regions facing one another axially, the overlapping web being secured with its edges spaced in the axial direction of the rotating drum each on one of the basic webs.

Distance strips are fitted by connecting elements such for example as rivets or screws, or by adhesion, upon the inner wall of the steel shell of the rotating drum. Since the movable basic webs of elastic material must attach firmly to these distance strips, a similar material will expediently be used for these as for the basic webs themselves. Due to the elasticity of the basic webs, for which it is possible to use by way of example polyvinyl chloride, nylon, polyethylene in various adjustments, rubber, chloroprene, with or without fabric inlays, these are stretched under loading and slackened on unloading, when the drum has correspondingly rotated further, whereby any caking substances etc. drop off due to the milling effect.

So that the basic webs may receive an appropriate mobility their free length is preferably somewhat greater than the distance between the distance strips. Naturally a loose sticking-in of these basic strips suffices for many cases; however a ratio of the distance between the distance strips and the freely movable axial length of these basic webs of at least 1:1.1 is preferred. In the case of products which are especially difficult to handle the basic webs can be fitted in the rotating drum in such a way that in the unloaded condition they sag approximately to the longitudinal axis of the rotating drum.

Fertilisers based upon calcium cyanamide or "limenitrogen" would nevertheless become firmly deposited at the positions where the basic webs of elastic material are secured to the distance strips. In this case "product rings" can occur which considerably hinder the flow of material and could give rise to further accumulations.

The overlapping webs which are stuck to the basic webs lying beneath them to both sides of the distance strips offer the solution to this problem. Thus these overlapping webs also move in accordance with the loading by the product travelling through the rotating drum, and thus bridge over the immobile positions of securing of the basic webs on the distance strips.

These overlapping webs cover over each of the radially attached webs by 1/10 to ⅓ of their length, calculated from the distance strips. The dimensions which are selected individually here depend upon the product to be handled and also upon the requisite type of material of the lining.

Due to the fact that the edges of the overlapping webs are bevelled off at the sides, the flow of product is promoted and excessively rapid mechanical wearing of the securing is avoided.

The thickness of the distance strips lies between 10 and 30 mm. Their attachment to the interior of the drum is effected by screws or rivets, but preferably by sticking with suitable adhesives.

The thickness of the elastic material depends upon its physical properties, especially upon its flexibility, or upon the size of the struck areas. In general however thickness of 4 to 12 mm. are sufficient. The overlapping webs preferably consist of the same material as the basic webs secured on the distance strips, but preferably have a thickness of only 2 to 10 mm.

As a result of the loading by the product passing through the rotating drum, the webs of elastic material are constantly deformed (milled) and finally completely relieved of load when the section concerned is situated in the upper half. In this part an ejection of any settled product takes place due to the shift of the elastic web, so that the web surface is completely cleaned when it dips again into the bulk material of the product bed.

The overlapping webs are pressed simultaneously with the basic webs in the lower part against the inner side of the drum by the product, and relieved of load in the upper part, whereby any attached product is ejected and the overlapping web shifts into the interior space of the rotating drum.

In the case of a granulating drum of length 16 m. and diameter 2 m., the entire interior space can be lined in the manner as described above, so that caking in operation is observed only to a very slight extent, if at all. In the case of a drum of such dimensions the distance strips of 8 to 12 mm. thickness and 20 to 50 mm. axial width are stuck at intervals of 1600 to 1800 mm. into the inner wall of the drum and basic webs of elastic material 5 to 7 mm. in thickness are stuck radially on to these. The overlapping web with a width of about 800 to 1300 mm. and a thickness of about 4 mm. is secured by sticking on to the elastic material. The adhesion areas should amount to 100 to 300 mm. on each side. In order to minimise the axially acting shear forces due to the product flow, the edges of the overlapping web are bevelled off at an angle of 10° to 60°.

Different dimensions of the rotating drum, different lining material or different product to be treated in the rotating drum influence the dimensions stated above and also the nature of the lining material. The equipment in accordance with the invention is possible with rotating drums of any desired dimensions, including conical or spherical vessels. The optimum dimensions of the elastic material can easily be found by simple experiments.

The rotating drums lined in this way are used especially for the pelleting of moistened materials or for the mixing of substances in powder form or which incline to cake.

More especially, with the rotating drum in accordance with the invention it is possible to pellet moist fertilisers and waste dusts. Furthermore it is possible to mix building material additives with the rotating drum in accordance with the invention.

BRIEF DESCRIPTION OF THE DRAWINGS

An example of embodiment of the rotating drum in accordance with the invention is represented in the FIGURE.

DESCRIPTION OF THE PREFERRED EMBODIMENTS

The cylindrical rotating drum, the axis of which is horizontal or inclined slightly in relation to the horizontal, is designated by 1. The inner side of the rotating drum is designated by 1a. Annular distance strips are fitted to the inner side of the rotating drum. The clear axial interval between successive distance strips 2 is designated by A, the axial width of the distance strips by B. The distance strips 2 are stuck to the inner side 1a of the rotating drum 1.

Basic webs 3 are secured to the distance strips 2, and in fact each basic web 3 has marginal regions R which overlap with the respective pertinent distance strips 2 and are stuck to these. The free length of the basic webs 3 between edges 2a facing one another is designated by L. The undulatory bracket by L indicates that this free length, measured in the relaxed condition of the basic web 3, is greater than the interval between the edges 2a facing one another of the two distance strips 2; in other words the basic web 3 between the two edges 2a, facing one another, of the two distance strips is slightly corrugated.

The basic webs 3 adjoining one another in the region of the distance strips 2 are each overlapped by an overlapping web 6 forming a closed ring. This overlapping web 6 is wider in the axial direction of the rotating drum than are the distance strips 2. In the axial direction it has overlaps C over the respectively associated edge of the distance strip 2. The edges 6a of the overlapping web 6 which are spaced in the axial direction are bevelled off at an angle for example of 45°, so that the inner side of the overlapping web 6 to some extent merges smoothly into the inner side of the basic webs 3. It is here to be ensured that the edges 6a are situated outside the region of the distance strips 2, that is are exposed to the milling effect to a considerable extent.

The adhesive connection between the distance strips 2 and the inner side 1a of the rotating drum is designated by 7. It extends preferably over the whole axial width B of the distance strips 2. The adhesive connections of the basic webs 3 with the distance strips 2 are designated by 8. They extend in each case over the marginal regions R.

The adhesive connection between the overlapping web 6 and the basic webs 3 is designated by 9; it extends over the whole width of the overlapping web 6.

We claim:

1. In a rotatable drum having an axis of rotation which is horizontal or inclined slightly in relation to the horizontal, having at least two movable basic webs of elastic material which avoid the caking-on of material and being arranged as a drum lining one beside the other in the axial direction of the rotating drum on the inner side thereof, said basic webs being connected with the rotating drum in their marginal regions axially facing one another, the improvement being that the basic webs are arranged at their marginal regions axially facing one another at a radial distance from the inner side of the rotating drum by distance strips and that there is provided an overlapping web which covers over each of the marginal regions, axially facing one another, of the basic webs, said overlapping web being secured with its edges, which are spaced in the axial direction of the rotating drum, each on one of the basic webs.

2. A rotatable drum according to claim 1, wherein the edges of an overlapping web, which are spaced in the axial direction of the rotating drum are bevelled.

3. A rotatable drum according to claim 1 or 2, wherein the overlapping web consists of thinner elastic material than do the basic webs.

4. A rotatable drum according to claim 1, wherein the basic webs are secured in their marginal regions to the rotating drum through the intermediary of distance strips.

5. A rotatable drum according to claim 1, wherein at least one of: the distance strips, the basic webs or the overlapping webs, are secured to a respective underlying structure by sticking means.

6. A rotatable drum according to one of claims 4 or 5, wherein the free length of the basic webs between edges facing one another of adjacent distance strips, measured in the axial direction of the rotating drum, is at least equal to the distance between these mutually facing edges.

7. A rotatable drum according to claim 6, wherein the free length of the basic webs between mutually facing edges of adjacent distance strips amounts to at least 1.1 times the axial distance between these mutually facing edges.

8. A rotatable drum according to one of claims 4 or 5, wherein the overlapping web possesses overlaps protruding in the axial direction of the rotating drum beyond the edges of the pertinent distance strip.

9. A rotatable drum according to claim 8, wherein the overlaps of the overlapping web amount of 1/10th to ⅓rd of the axial distance between the respectively associated distance strips.

10. A rotatable drum according to claim 1, wherein the radial distance of a basic web from the inner side of the rotating drum, measured between the associated marginal regions, is approximately equal to the thicknes of said distance strips in the marginal regions.

11. A rotatable drum according to claim 1, wherein the basic web is deflectable in the radial direction towards the drum axis, between the pertinent marginal zones, in the unloaded condition, under the action of the force of gravity.

* * * * *